US009337545B2

(12) United States Patent
Lettkeman et al.

(10) Patent No.: US 9,337,545 B2
(45) Date of Patent: *May 10, 2016

(54) APPARATUS AND SYSTEMS FOR MOUNTING AN ELECTRICAL SWITCHING DEVICE

(71) Applicant: DISH Network L.L.C., Englewood, CO (US)

(72) Inventors: David M. Lettkeman, Parker, CO (US); Eric Bolze, Phoenix, AZ (US); Jason S. Schmidt, Aurora, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/188,408

(22) Filed: Feb. 24, 2014

(65) Prior Publication Data

US 2014/0252182 A1    Sep. 11, 2014

Related U.S. Application Data

(63) Continuation-in-part of application No. 13/085,210, filed on Apr. 12, 2011, and a continuation-in-part of application No. 13/084,632, filed on Apr. 12, 2011, which is a continuation-in-part of application No.

(Continued)

(51) Int. Cl.
*H01Q 1/12* (2006.01)
*H01Q 19/13* (2006.01)
(Continued)

(52) U.S. Cl.
CPC ............... *H01Q 19/132* (2013.01); *F16B 2/12* (2013.01); *H01Q 1/125* (2013.01); *F16B 5/0685* (2013.01)

(58) Field of Classification Search
CPC ............................. H01Q 1/125; H01Q 19/132
USPC .................................................. 343/878, 892
See application file for complete search history.

(56) References Cited

U.S. PATENT DOCUMENTS 1,994,998 A    3/1935 Hull
3,347,505 A    10/1967 Menser
(Continued)

FOREIGN PATENT DOCUMENTS

JP    2000-049516 A    2/2000
JP    2002-374108 A    12/2002
(Continued)

OTHER PUBLICATIONS

Intellectual Property Office of the Republic of China (Taiwan) for ROC Pat App. No. 097149159, Office Action dated Sep. 19, 2014, 20 pages.

(Continued)

*Primary Examiner* — Todd M Epps
(74) *Attorney, Agent, or Firm* — Kilpatrick Towsend & Stockton LLP

(57) ABSTRACT

Described herein are mounting plates which facilitate securing of the electrical switching device to an object. The plate mounts to an object and is configured to secure one or more electrical switching devices. The mounting plate includes a planar surface having a plurality of first through holes configured to secure an electrical switching device to a first side of the planar surface. The mounting plate further includes a bracket attached to a second side of the planar surface configured to secure the mounting plate to another object.

19 Claims, 20 Drawing Sheets

Related U.S. Application Data

12/483,016, filed on Jun. 11, 2009, now Pat. No. 8,081,139.

(60) Provisional application No. 61/074,352, filed on Jun. 20, 2008.

(51) Int. Cl.
  *F16B 2/12* (2006.01)
  *F16B 5/06* (2006.01)

(56) References Cited

U.S. PATENT DOCUMENTS

| | | | |
|---|---|---|---|
| 3,392,848 | A | 7/1968 | McConnell et al. |
| 3,728,796 | A | 4/1973 | Lobaugh |
| 4,174,821 | A | 11/1979 | Levine |
| 4,203,639 | A | 5/1980 | Mohr et al. |
| 4,358,096 | A | 11/1982 | Paton et al. |
| 4,361,375 | A | 11/1982 | Bailey et al. |
| 4,500,064 | A | 2/1985 | Calabro |
| 4,535,689 | A | 8/1985 | Putkowski |
| 4,546,549 | A | 10/1985 | Duperon |
| 4,589,213 | A | 5/1986 | Woodward |
| 4,598,297 | A | 7/1986 | Hawkins |
| 4,698,640 | A | 10/1987 | Redman |
| 4,850,114 | A | 7/1989 | Vockins |
| 4,858,865 | A | 8/1989 | Schrepfer |
| 4,858,878 | A | 8/1989 | Gassaway |
| 4,888,875 | A | 12/1989 | Strother |
| 4,908,949 | A | 3/1990 | Jaccard |
| 4,934,706 | A | 6/1990 | Marshall |
| 5,002,216 | A | 3/1991 | Gerber |
| 5,063,679 | A | 11/1991 | Schwandt |
| 5,149,277 | A | 9/1992 | LeMaster |
| 5,154,000 | A | 10/1992 | Mahoney et al. |
| 5,167,075 | A | 12/1992 | Weldy et al. |
| 5,306,165 | A | 4/1994 | Nadeau |
| 5,359,820 | A | 11/1994 | McKay |
| 5,574,256 | A | 11/1996 | Cottone |
| 5,617,680 | A | 4/1997 | Beatty |
| 5,738,020 | A | 4/1998 | Correia |
| 5,886,673 | A | 3/1999 | Thomas |
| 5,947,752 | A | 9/1999 | Wu |
| 5,963,179 | A | 10/1999 | Chavez |
| 6,180,878 | B1 | 1/2001 | Gretz |
| 6,262,691 | B1 | 7/2001 | Austin et al. |
| 6,273,377 | B1 | 8/2001 | Archer |
| 6,293,035 | B1 | 9/2001 | LaPointe |
| 6,361,007 | B1 | 3/2002 | Oby et al. |
| 6,366,253 | B1 | 4/2002 | Hemmingsen, II |
| 6,375,161 | B2 | 4/2002 | Garceau |
| 6,385,856 | B1 | 5/2002 | Godin |
| 6,396,459 | B1 | 5/2002 | Pullman |
| 6,404,405 | B2 | 6/2002 | Wanat |
| 6,427,348 | B1 | 8/2002 | Webb |
| 6,445,361 | B2 * | 9/2002 | Liu .................. 343/878 |
| 6,450,464 | B1 | 9/2002 | Thomas |
| 6,460,821 | B1 | 10/2002 | Rhudy et al. |
| 6,532,675 | B2 | 3/2003 | Letourneau |
| 6,727,861 | B2 | 4/2004 | Antoine |
| 6,731,250 | B1 | 5/2004 | Berman |
| 6,734,830 | B1 | 5/2004 | Bickham |
| 6,766,992 | B1 | 7/2004 | Parker |
| 6,768,474 | B2 | 7/2004 | Hunt |
| 6,777,611 | B2 | 8/2004 | Ewald et al. |
| 6,834,435 | B2 | 12/2004 | Turner |
| 6,873,304 | B1 * | 3/2005 | Malhotra ............ H01Q 1/1221 248/346.01 |
| 6,905,060 | B2 | 6/2005 | Van Aken et al. |
| 6,996,911 | B1 | 2/2006 | Dinius |
| 7,000,746 | B2 | 2/2006 | Mackin et al. |
| 7,027,006 | B2 | 4/2006 | Holle |
| D522,967 | S | 6/2006 | St. Clair |
| 7,057,575 | B2 * | 6/2006 | Malhotra ............ H01Q 1/1221 248/346.01 |
| 7,106,082 | B2 | 9/2006 | Yoshioka |
| 7,106,273 | B1 | 9/2006 | Brunson et al. |
| 7,122,738 | B2 | 10/2006 | Kanamaru |
| 7,220,129 | B1 | 5/2007 | Nishijima et al. |
| 7,253,785 | B2 | 8/2007 | Holle |
| 7,260,920 | B2 | 8/2007 | Weir |
| 7,456,802 | B1 | 11/2008 | Bourgeois |
| 7,460,081 | B2 | 12/2008 | Holle |
| 7,554,036 | B1 | 6/2009 | DeCosta |
| 7,555,842 | B1 | 7/2009 | Asay |
| 7,563,131 | B2 | 7/2009 | Sullivan et al. |
| 7,592,719 | B2 | 9/2009 | Hoopes |
| D603,342 | S | 11/2009 | DeCosta |
| 7,648,379 | B2 | 1/2010 | Johnson et al. |
| 7,651,353 | B2 | 1/2010 | Laukhuf |
| 7,683,853 | B2 | 3/2010 | Michaelis |
| 7,692,094 | B1 | 4/2010 | DeCosta |
| 7,741,562 | B2 | 6/2010 | Crotinger et al. |
| D632,545 | S | 2/2011 | DeCosta |
| 7,918,425 | B2 | 4/2011 | Rathbone et al. |
| 7,997,546 | B1 | 8/2011 | Anderson et al. |
| 8,011,628 | B1 | 9/2011 | Suddeth |
| 8,015,929 | B2 | 9/2011 | Tyner |
| D647,488 | S | 10/2011 | DeCosta |
| 8,061,051 | B2 | 11/2011 | Allemand |
| 8,081,139 | B2 * | 12/2011 | Schmidt ............ H01Q 1/1207 248/285.1 |
| 8,336,221 | B2 | 12/2012 | Steele et al. |
| 8,339,329 | B2 | 12/2012 | Shen |
| 8,350,153 | B1 | 1/2013 | DeCosta |
| D678,840 | S | 3/2013 | DeCosta |
| D684,935 | S | 6/2013 | DeCosta |
| 8,462,075 | B2 | 6/2013 | Lettkeman |
| 8,646,186 | B2 | 2/2014 | Lettkeman et al. |
| 8,698,692 | B2 | 4/2014 | Lettkeman |
| 8,780,008 | B2 * | 7/2014 | Lettkeman ............ H01Q 1/12 343/878 |
| 8,819,743 | B2 | 8/2014 | Kirchner |
| 8,907,862 | B2 * | 12/2014 | Lettkeman ............ H01Q 1/125 343/878 |
| 2002/0003504 | A1 * | 1/2002 | Yoshida ............ H01Q 1/1207 343/892 |
| 2002/0067591 | A1 | 6/2002 | Tajima |
| 2002/0105476 | A1 | 8/2002 | Overton |
| 2002/0190172 | A1 | 12/2002 | Oddsen, Jr. |
| 2003/0086023 | A1 | 5/2003 | Chung et al. |
| 2003/0229900 | A1 | 12/2003 | Reisman |
| 2004/0149475 | A1 | 8/2004 | Gorin |
| 2004/0248462 | A1 | 12/2004 | Dyer et al. |
| 2005/0001781 | A1 * | 1/2005 | Antoine ............ H01Q 1/1207 343/878 |
| 2005/0007241 | A1 | 1/2005 | Kline et al. |
| 2005/0101183 | A1 | 5/2005 | McCoy et al. |
| 2005/0101336 | A1 | 5/2005 | Otsuka |
| 2005/0250375 | A1 | 11/2005 | Allison |
| 2006/0053447 | A1 | 3/2006 | Krzyzanowski et al. |
| 2006/0067066 | A1 | 3/2006 | Meier et al. |
| 2006/0248553 | A1 | 11/2006 | Mikkelson et al. |
| 2007/0192798 | A1 | 8/2007 | Morgan |
| 2007/0210978 | A1 * | 9/2007 | Zihlman ............ H01Q 3/08 343/892 |
| 2008/0117091 | A1 | 5/2008 | Binder |
| 2008/0233794 | A1 | 9/2008 | Clark et al. |
| 2008/0271331 | A1 | 11/2008 | Allemand |
| 2009/0052122 | A1 | 2/2009 | Johnson et al. |
| 2009/0056970 | A1 | 3/2009 | Hoffman et al. |
| 2009/0124113 | A1 | 5/2009 | Sexton et al. |
| 2009/0150940 | A1 | 6/2009 | St. John-Larkin |
| 2009/0165058 | A1 | 6/2009 | Kirchner |
| 2009/0251880 | A1 | 10/2009 | Anderson |
| 2009/0315804 | A1 | 12/2009 | Schmidt et al. |
| 2010/0031295 | A1 | 2/2010 | Krzyzanowski et al. |
| 2010/0046194 | A1 | 2/2010 | Yang et al. |
| 2010/0075540 | A1 | 3/2010 | Liao |
| 2010/0141379 | A1 | 6/2010 | Tucker et al. |
| 2010/0147580 | A1 | 6/2010 | Koesterich |
| 2010/0177010 | A1 | 7/2010 | Michaelis |
| 2010/0219183 | A1 | 9/2010 | Azancot et al. |
| 2011/0021066 | A1 | 1/2011 | Squires |

(56) References Cited

U.S. PATENT DOCUMENTS

| | | | |
|---|---|---|---|
| 2011/0032172 A1* | 2/2011 | Kirby | H01Q 1/084 343/878 |
| 2011/0032175 A1 | 2/2011 | Kang | |
| 2011/0083399 A1* | 4/2011 | Lettkeman | E04H 12/24 52/745.21 |
| 2011/0156984 A1 | 6/2011 | Caldwell et al. | |
| 2011/0187624 A1* | 8/2011 | Lettkeman | H01Q 3/02 343/882 |
| 2011/0205142 A1* | 8/2011 | Lettkeman | F16M 11/04 343/882 |
| 2011/0259883 A1 | 10/2011 | DeCosta | |
| 2012/0137530 A1 | 6/2012 | Yun | |
| 2012/0151785 A1 | 6/2012 | Lettkeman et al. | |
| 2012/0162044 A1 | 6/2012 | Lettkeman et al. | |
| 2012/0256496 A1 | 10/2012 | DeCosta | |
| 2012/0256809 A1 | 10/2012 | Lettkeman | |
| 2012/0261529 A1 | 10/2012 | Lettkeman | |
| 2013/0056259 A1 | 3/2013 | Lettkeman | |
| 2013/0256480 A1 | 10/2013 | Lettkeman | |
| 2014/0033496 A1 | 2/2014 | Lettkeman et al. | |
| 2014/0090260 A1 | 4/2014 | Lettkeman et al. | |
| 2014/0174816 A1 | 6/2014 | Lettkeman | |
| 2014/0366078 A1 | 12/2014 | Kirchner | |

FOREIGN PATENT DOCUMENTS

| | | | |
|---|---|---|---|
| KR | 2000-0047707 A | 7/2000 | |
| WO | 2014/022087 A1 | 2/2014 | |

OTHER PUBLICATIONS

U.S. Appl. No. 13/563,537, filed Jul. 31, 2012, Final Office Action mailed Jan. 30, 2015, 36 pages.
Intellectual Property Office of the Republic of China (Taiwan) for ROC Pat App. No. 097149159, Final Office Action dated Dec. 13, 2012, 9 pages.
U.S. Appl. No. 14/193,641, filed Feb. 28, 2014, Non-Final Office Action mailed Feb. 28, 2014, 36 pages.
International Preliminary Report on Patentability for PCT/US2013/050597 mailed Feb. 12, 2015, 6 pages.
U.S. Appl. No. 12/979,597, filed Dec. 28, 2010, Non Final Office Action mailed Mar. 30, 2015, 17 pages.
U.S. Appl. No. 13/563,537, filed Jul. 31, 2012, Notice of Allowance mailed Jun. 8, 2015, 32 pages.
U.S. Appl. No. 14/465,588, filed Aug. 21, 2014, Non-Final Office Action mailed May 7, 2015, 22 pages.
U.S. Appl. No. 14/465,588, filed Aug. 21, 2014, Notice of Allowance mailed Aug. 28, 2015, 20 pages.
International Search Report and Written Opinion of PCT/US2013/050597 mailed Jan. 10, 2014, 17 pages.
U.S. Appl. No. 12/979,597, filed Dec. 28, 2010, Final Office Action mailed Sep. 17, 2014, 16 pages.
U.S. Appl. No. 12/970,749, filed Dec. 16, 2010, Notice of Allowance mailed Apr. 16, 2014, 24 pages.
U.S. Appl. No. 13/084,632, filed Apr. 12, 2011, Notice of Allowance mailed Mar. 6, 2014, 15 pages.
U.S. Appl. No. 13/085,210, filed Apr. 12, 2011, Notice of Allowance mailed Aug. 8, 2014, 20 pages.
U.S. Appl. No. 14/098,294, filed Dec. 5, 2013, Non Final Office Action mailed Mar. 13, 2014, 15 pages.
U.S. Appl. No. 14/098,294, filed Dec. 5, 2013, Notice of Allowance mailed Jul. 30, 2014, 21 pages.
Legrand, "Flat Screen TV Cord and Cable Power Kit—CMK70," 2011, 1 page.
MIDLITE Corporation, "The Power Jumper, HDTV Power Relocation Kit," Nov. 10, 2011, www. Midlite.com, 1 page.
Powerbridge, "3D Power Cable Total Solution Connector Kit Model #TSCK Power Extension Cable Management," Retrieved online Oct. 18, 2013, 2 pages.
Powerbridge "Powerbridge In-Wall Power Extension System Home," Retrieved from http://www.powerbridgesolution.com on Sep. 7, 2011, 4 pages.
Sewell, "DataComm Flat Panel TV Cable Organizer Remodeling Kit with Power Outlet," Known to exist Nov. 1, 2013. Retrieved from http://sewelldirect.com/Recessed-Cable-Plate-Remodeling-Kit-with-Electrical-Outlet.asp., 3 pages.
International Search Report and Written Opinion of PCT/US2010/052431, mailed Jun. 10, 2011, 7 pages.
International Search Report and Written Opinion of PCT/US2008/086423 mailed May 11, 2008, 14 pages.
U.S. Appl. No. 12/328,082, filed Dec. 4, 2008, Notice of Allowance mailed Apr. 16, 2014, 24 pages.
U.S. Appl. No. 12/328,082, filed Dec. 4, 2008, Final Office Action mailed Dec. 5, 2013, 13 pages.
U.S. Appl. No. 12/328,082, filed Dec. 4, 2008, Non Final Office Action mailed Jul. 8, 2013, 16 pages.
U.S. Appl. No. 12/328,082, filed Dec. 4, 2008, Final Office Action mailed Oct. 26, 2012, 16 pages.
U.S. Appl. No. 12/328,082, filed Dec. 4, 2008, Non Final Office Action mailed Apr. 20, 2012, 13 pages.
U.S. Appl. No. 12/328,082, filed Dec. 4, 2008, Non Final Office Action mailed Nov. 15, 2011, 18 pages.
U.S. Appl. No. 12/328,082, filed Dec. 4, 2008, Non Final Office Action mailed Jan. 14, 2011, 19 pages.
U.S. Appl. No. 12/483,016, filed Jun. 11, 2009, Notice of Allowance mailed Nov. 8, 2011, 8 pages.
U.S. Appl. No. 12/578,367, filed Oct. 13, 2009, Final Office Action mailed Nov. 19, 2012, 10 pages.
U.S. Appl. No. 12/578,367, filed Oct. 13, 2009, Non-Final Office Action mailed May 14, 2012, 12 pages.
U.S. Appl. No. 12/578,367, filed Oct. 13, 2009, Final Office Action mailed Jan. 31, 2012, 11 pages.
U.S. Appl. No. 12/578,367, filed Oct. 13, 2009, Non-Final Office Action mailed Sep. 20, 2011, 21 pages.
U.S. Appl. No. 12/711,103, filed Feb. 23, 2010, Notice of Allowance mailed Feb. 12, 2013, 13 pages.
U.S. Appl. No. 12/711,103, filed Feb. 23, 2010, Non-Final Office Action mailed Aug. 1, 2012, 16 pages.
U.S. Appl. No. 12/970,749, filed Dec. 16, 2010, Notice of Allowance mailed Sep. 5, 2013, 9 pages.
U.S. Appl. No. 12/970,749, filed Dec. 16, 2010, Non-Final Office Action mailed May 16, 2013, 13 pages.
U.S. Appl. No. 12/970,749, filed Dec. 16, 2010, Final Office Action mailed Feb. 6, 2013, 15 pages.
U.S. Appl. No. 12/970,749, filed Dec. 16, 2010, Non-Final Office Action mailed Sep. 14, 2012, 16 pages.
U.S. Appl. No. 12/979,597, filed Dec. 28, 2010, Non-Final Office Action mailed Mar. 28, 2014, 12 pages.
U.S. Appl. No. 13/081,364, filed Apr. 6, 2011, Non-Final Office Action mailed Apr. 25, 2013, 12 pages.
U.S. Appl. No. 13/084,632, filed Apr. 12, 2011 Notice of Allowance mailed Nov. 18, 2013, 23 pages.
U.S. Appl. No. 13/084,632, filed Apr. 12, 2011 Non-Final Rejection mailed Jun. 3, 2013, 9 pages.
U.S. Appl. No. 13/085,210, filed Apr. 12, 2011 Final Office Action mailed Oct. 25, 2013, 12 pages.
U.S. Appl. No. 13/085,210, filed Apr. 12, 2011 Non-Final Office Action mailed Mar. 27, 2013, 11 pages.
U.S. Appl. No. 13/226,929, filed Sep. 7, 2011, Notice of Allowance mailed Mar. 31, 2014, 16 pages.
U.S. Appl. No. 13/226,929, filed Sep. 7, 2011, Final Office Action mailed Feb. 12, 2014, 30 pages.
U.S. Appl. No. 13/226,929, filed Sep. 7, 2011, Non-Final Office Action mailed Jun. 28, 2013, 31 pages.
U.S. Appl. No. 13/893,304, filed May 13, 2013, Notice of Allowance mailed Dec. 2, 2013, 23 pages.
U.S. Appl. No. 13/893,304, filed May 13, 2013, Non-Final Office Action mailed Aug. 1, 2013, 10 pages.

* cited by examiner

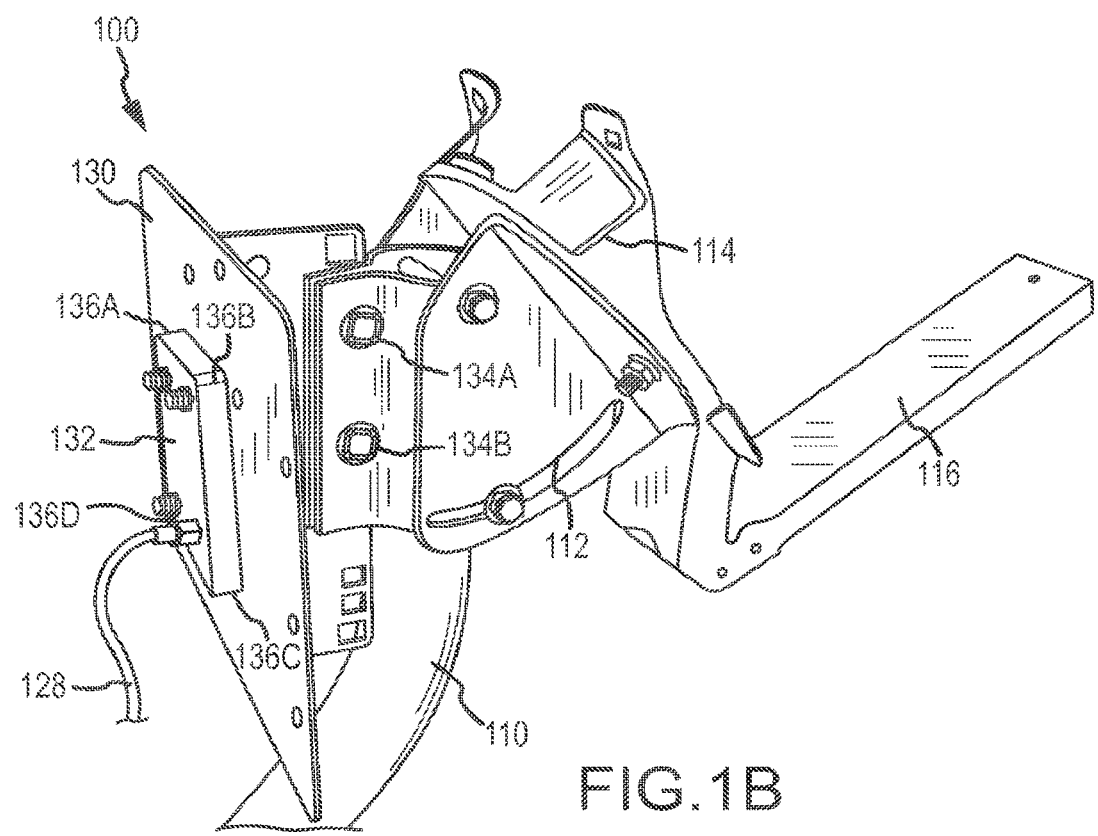

APPARATUS AND SYSTEMS FOR MOUNTING AN ELECTRICAL SWITCHING DEVICE

CROSS REFERENCE TO RELATED APPLICATION

This application is a continuation-in-part of co-pending U.S. patent application Ser. No. 13/085,210, filed 12 Apr. 2011, entitled "Apparatus and Systems for Mounting an Electrical Switching Device," the entirety of which is hereby incorporated by reference for all intents and purposes.

This application is a continuation-in-part of co-pending U.S. patent application Ser. No. 13/084,632, filed 12 Apr. 2011, entitled "Reinforced Mount for an Antenna Assemble," which is a continuation-in-part of U.S. patent application Ser. No. 12/483,016, filed 11 Jun. 2009, now U.S. Pat. No. 8,081,139, entitled "Structures and Methods for Mounting an Antenna," which claims priority from U.S. Provisional Patent Application No. 61/074,352, filed 20 Jun. 2008, entitled, "Structures and Methods for Mounting an Antenna," the entirety of which are hereby incorporated by reference for all intents and purposes.

BACKGROUND

Small satellite dishes may be mounted to the outside of a structure, such as a home and allow a viewer to receive communication services, such as television programming, via a communication satellite. The satellite dish may be mounted in various places on a structure, such as a roof, side wall or railing. The satellite dish includes an antenna, such as a low noise blocking (LNB) converter, for receiving television programming from the communication satellite. The LNB may include multiple coaxial outputs which are connected to cabling that transmits communication signals into a structure for further processing by one or more satellite receivers, such as a television receiver set-top box. Electrical switching devices are utilized to communicatively couple the satellite receivers to various cabling that connects to one or more satellite antenna. However, many installation configurations, such as railing mount satellite dish installations, do not provide an adequate location to position the electrical switching device at the proper level and/or orientation. Thus, mounting solutions are desired that provide more suitable locations for placement of the electrical switching devices.

BRIEF DESCRIPTION OF THE DRAWINGS

The same number represents the same element or same type of element in all drawings.

FIG. 1B illustrates a side view of a portion of the satellite antenna mounting environment of FIG. 1A.

DETAILED DESCRIPTION OF THE DRAWINGS

Figure 1A:
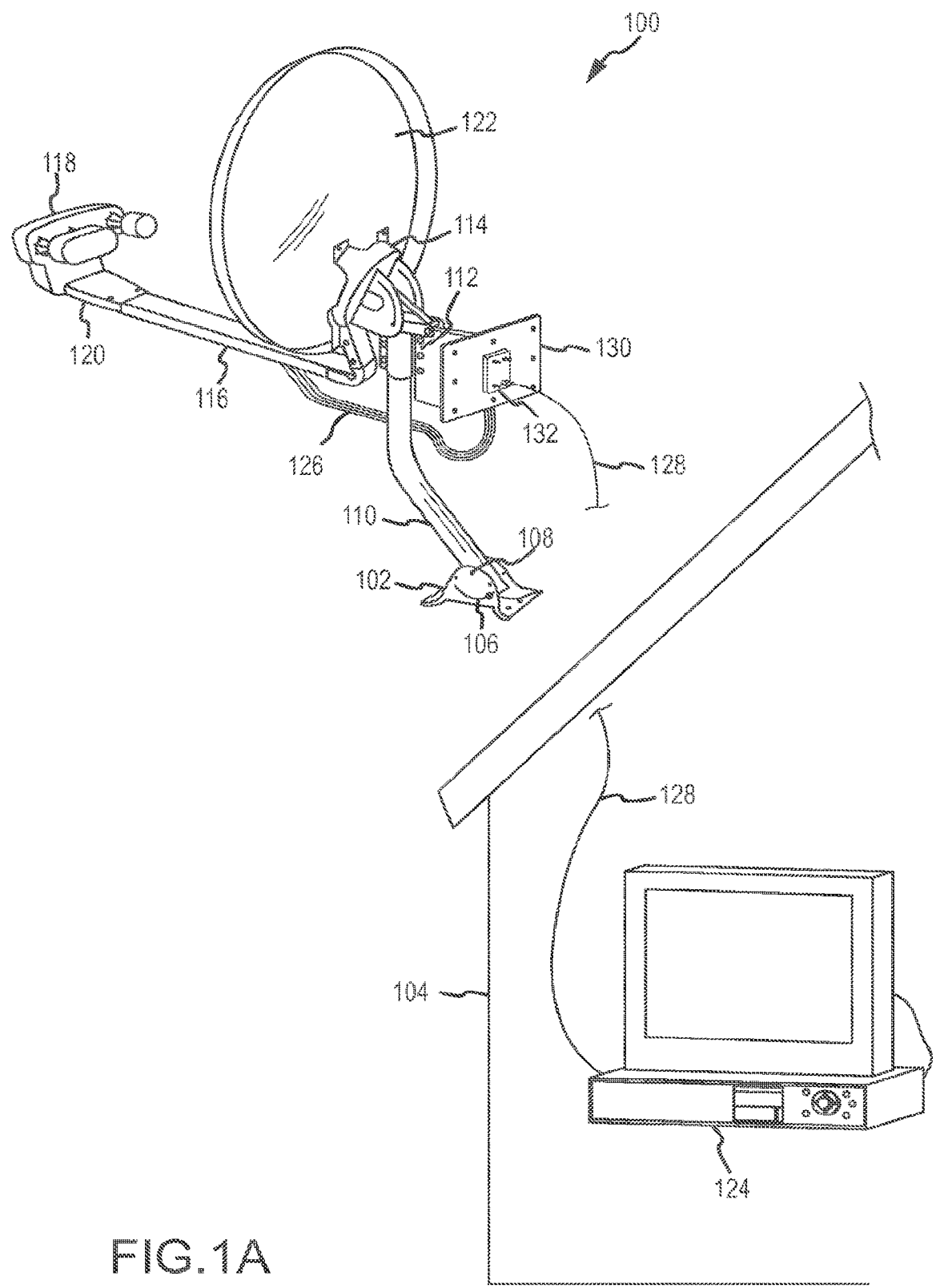
FIG. 1A illustrates an embodiment of a satellite antenna mounting environment.

Described herein are apparatus, systems and methods for mounting objects, such as electrical switching devices. More particularly, described herein are mounting plates which facilitate securing of the electrical switching device to a satellite antenna, railing mount or other object. The plate mounts to an object and is configured to secure one or more electrical switching devices. Thus, the mounting plate provides a convenient location for the electrical switching device near the antenna and an easy point of access to allow a technician to connect various cabling to the antenna and electronics associated with an antenna, such as satellite receivers located within the structure.

A first embodiment provided herein comprises a mounting plate. The mounting plate includes a planar surface, having a plurality of first through holes, each of the first through holes configured to secure an electrical switching device to a first side of the planar surface. The mounting plate further includes a bracket attached to a second side of the planar surface. The bracket is configured to secure the mounting plate to another object. In various embodiments, the bracket may comprise an L-bracket, a T-bracket, tubing, C-clamp or the like configured to attach to another object, such as an antenna mast, railing mount or mast clamp. In another embodiment, the mounting plate may be secured to another object via appropriate fasteners, such as screws, bolts and the like.

Another embodiment described herein comprises an antenna mounting system. The system includes a base attached to a structure, a mast attached to the base and a mast clamp attached to the mast. The mast clamp is configured to secure an antenna to the mast. The system further includes an electrical switching device communicatively coupled to the antenna and a mounting plate. The mounting plate includes a planar surface having a plurality of first through holes, each of the first through holes configured to secure the electrical switching device to a first side of the planar surface. The mounting plate may further include a bracket attached to a second side of the planar surface, the bracket configured to secure the mounting plate to the mast clamp.

Another embodiment described herein comprises an antenna mounting system. The system includes a railing mount attached to at least one railing of a structure, a base attached to the railing mount, a mast attached to the base and a mast clamp attached to the mast. The mast clamp is configured to secure an antenna to the mast. The system further includes an electrical switching device communicatively coupled to the antenna and a mounting plate. The mounting plate includes a planar surface having a plurality of first through holes, each of the first through holes configured to secure the electrical switching device to a first side of the planar surface and a bracket perpendicularly attached to a second side of the planar surface, the bracket configured to secure the mounting plate to the railing mount.

The techniques illustrated herein will be described in the context of mounting a satellite antenna to a structure. However, it is to be appreciated that the techniques described herein may be applied to mounting any type of antenna to any type of object, such as a pole, recreational vehicle, fence and the like. Furthermore, the techniques described herein may be applied to mounting of any type of electrical device to any type of object.

In addition, directional references employed below, such as "up", "down", "left", "right", "back", "front", "upper", "lower", and so on, are provided to relate various aspects of the structures to each other, and are not intended to limit the embodiments disclosed herein to a particular orientation with respect to their surrounding environment.

FIG. 1A illustrates an embodiment of a satellite antenna mounting environment 100. FIG. 1B illustrates a side view of a portion of the satellite antenna mounting environment of FIG. 1A. The environment 100 illustrates a satellite antenna mounted to a structure 104. The environment 100 of FIG. 1A includes a base 102, a structure 104, a mast adjustment bolt 106, a pivot bolt 108, a mast 110, a mast clamp 112, a reflector mounting bracket 114, a feedhorn arm 116, an antenna 118, an adapter bracket 120, a satellite reflector 122, a receiving device 124, first cabling 126, second cabling 128, a mounting plate 130, electrical switching device 132, first securing mechanisms 134A-134B and second securing mechanisms 136A-136D (see FIG. 1B). Each of these components will be discussed in greater detail below. The environment 100 may include other components not illustrated for the sake of brevity.

The base 102 is attached to a side of the structure 104. The base 102 is attached to the mast 110 via the pivot bolt 108 and the adjustment bolt 106. The mast 110 is attached to the feedhorn arm 116 via the mast clamp 112. The feedhorn arm 116 suspends the antenna 118 (also known as an LNB) away from the satellite reflector 122. First cabling 126 is coupled to the antenna 118 and communicatively couples to the cable connectors 132A-132D. More particularly, the first cabling 126 is positioned to be secured within a channel of the feedhorn arm 116. The antenna 118 is secured to the feedhorn arm 116 via the adapter bracket 120.

The satellite reflector 122 is secured to the mast 110 via the reflector mounting bracket 114. As illustrated in FIG. 1A and FIG. 1B, the mounting plate 130 is secured to the mast clamp 112 using one or more securing mechanisms 134A-134B. More particularly, in at least one embodiment, the mounting plate 130 includes a plurality of through holes which receive the securing mechanisms 134A-134B. In at least one embodiment, the first securing mechanisms 134A-134B comprise threaded members, such as screws, bolts and nuts. In another embodiment, the mounting plate 130 may include one or more C-clamps which attach to the mast clamp 112. Alternatively, the mast clamp 112 may include C-clamps which attach to through holes and/or other portions of the mounting plate 130. The mounting plate 130 may be constructed of any appropriate material, such as metal, plastic and the like.

Figure 2:
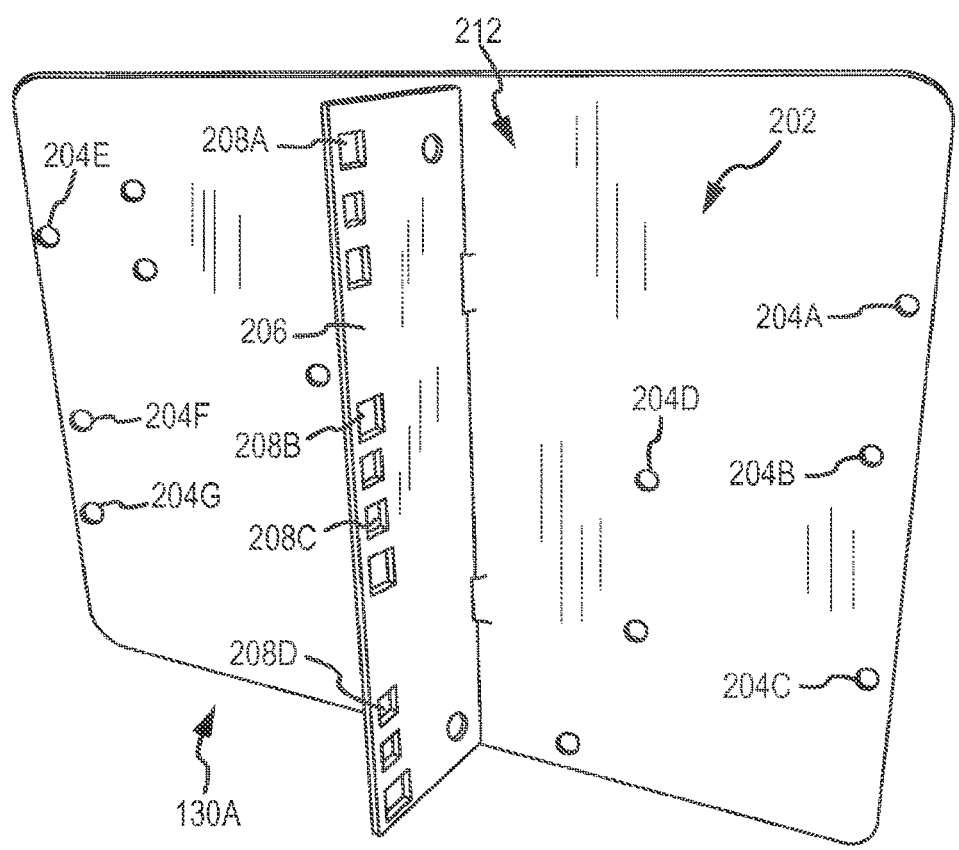
FIG. 2 illustrates a back perspective view of an embodiment of the mounting plate of FIG. 1.
Figure 3A:
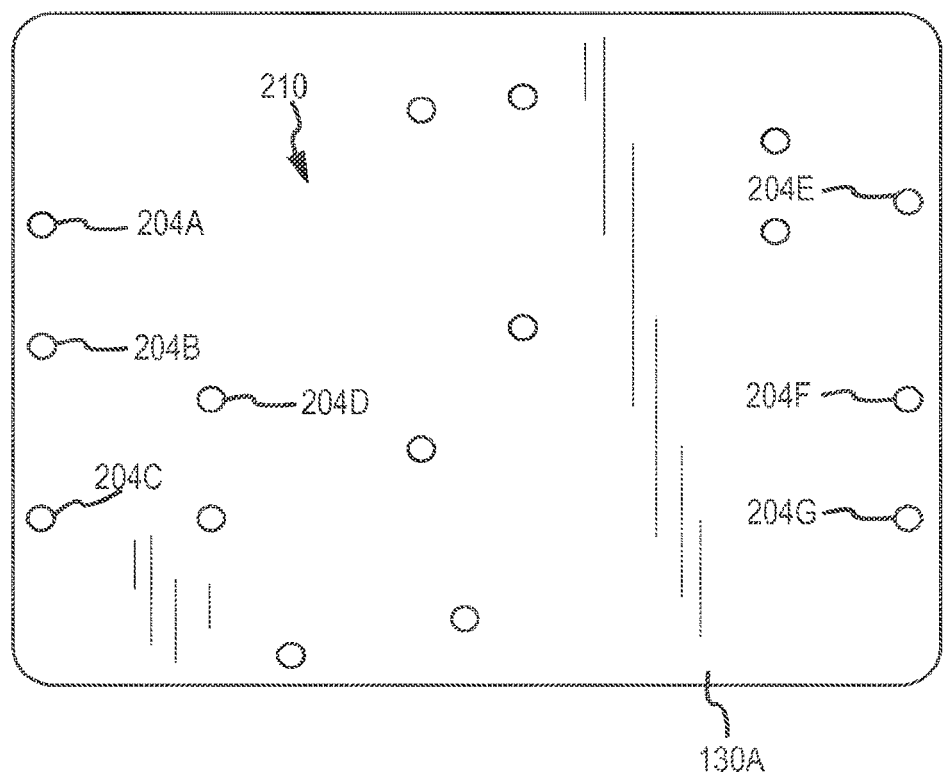
FIG. 3A illustrates a front view of an embodiment of the mounting plate 130 of FIG. 1.
Figure 3B:
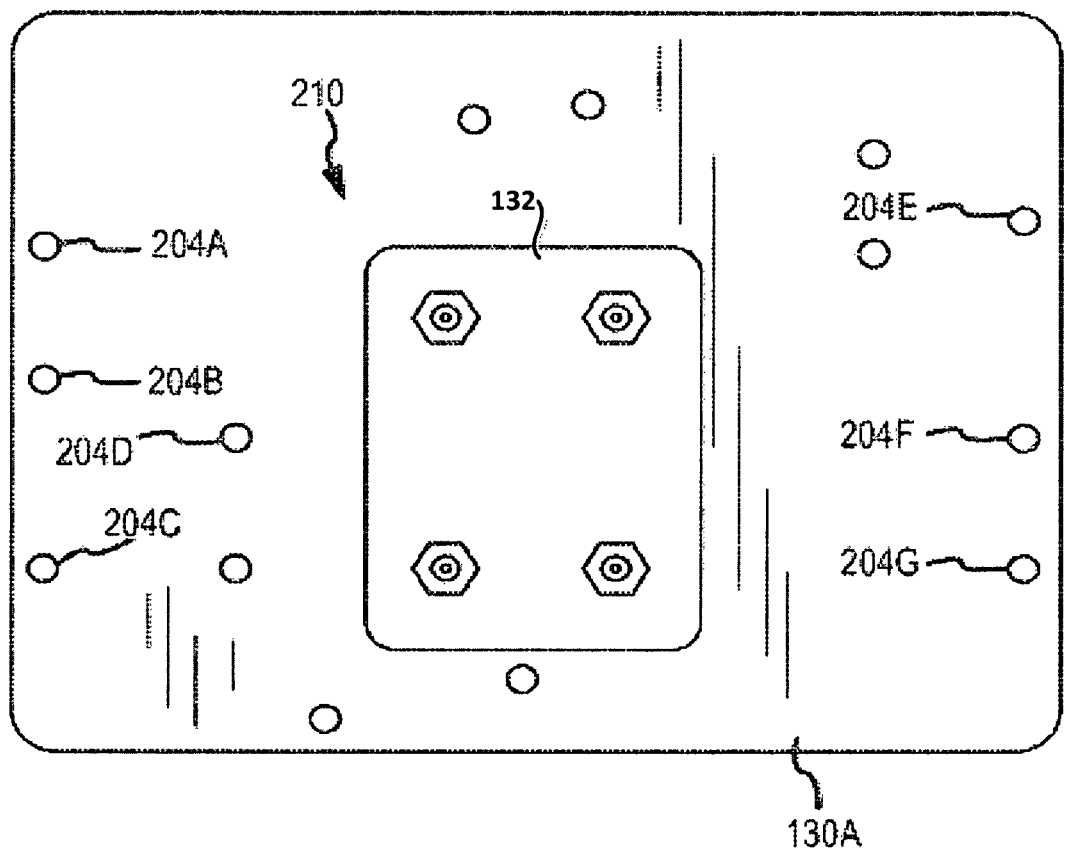
FIG. 3B illustrates a front view of an embodiment of the mounting plate 130 of FIG. 1 with an electrical switching device secured thereto.

FIG. 2 illustrates a back perspective view of an embodiment of the mounting plate 130 of FIG. 1. FIG. 3A illustrates a front view of an embodiment of the mounting plate 130 of FIG. 1. FIG. 3B illustrates a front view of an embodiment of the mounting plate 130 of FIG. 1 with an electrical switching device secured thereto. The mounting plate 130A includes a planar surface 202, a plurality of first through holes 204A-204G, a bracket 206 and a plurality of second through holes 208A-208D. Each of these components is discussed in great detail below.

The planar surface 202 includes a plurality of first through holes 204A-206G. Each of the first through holes 204A-204G is configured to receive securing mechanisms 136A-136B which secure the electrical switching device to a first side 210 (see FIG. 3A and FIG. 3B) of the planar surface 202. More particularly, one or more of the first through holes 204A-204G are configured to correspond with like through holes of the switching device 132. Securing mechanisms 136A-136D (see FIG. 1B), such as bolts and nuts, are utilized to secure the switching device 132 to the mounting plate 130A. In other embodiments, other securing mechanisms, such as snaps, ties, C-clamps or the like may be utilized to secure the switching device 132 to the mounting plate 130A. As illustrated, the planar surface 202 includes a plurality of first through holes 204A-204G disposed in various positions to secure different sized electrical switching devices 132 to the planar surface 202 and/or to secure the electrical switching device 132 to the planar surface 202 in different orientations.

The bracket 206 is attached to a second side 212 (see FIG. 2) of the planar surface 202. The bracket is configured to secure the mounting plate 130B to the mast clamp 112. In the illustrated embodiment, the bracket 206 includes a plurality of second through holes 208A-208D which correspond with like holes on the mast clamp 112. Thus, appropriate securing mechanisms 134A-134B (e.g., nuts and bolts or the like as illustrated in FIG. 1B) may be utilized to secure the bracket 206 to the mast clamp 112. While the bracket is illustrated in the middle of the planar surface 206, it is to be appreciated that the bracket 206 may be positioned anywhere on the planar surface in any orientation depending on desired design criteria.

Figure 4:
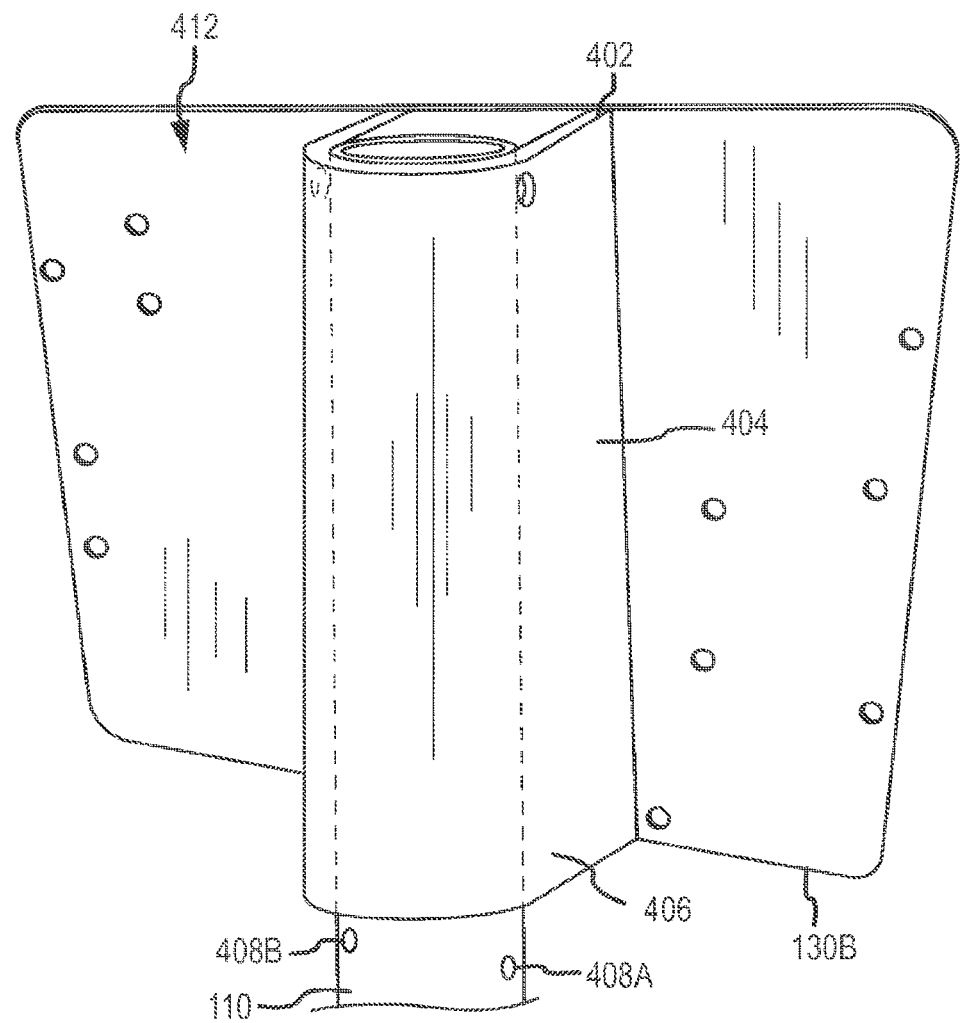
FIGS. 4 and 5 illustrate multiple views of another embodiment of the mounting plate 130 of FIG. 1.
Figure 5:
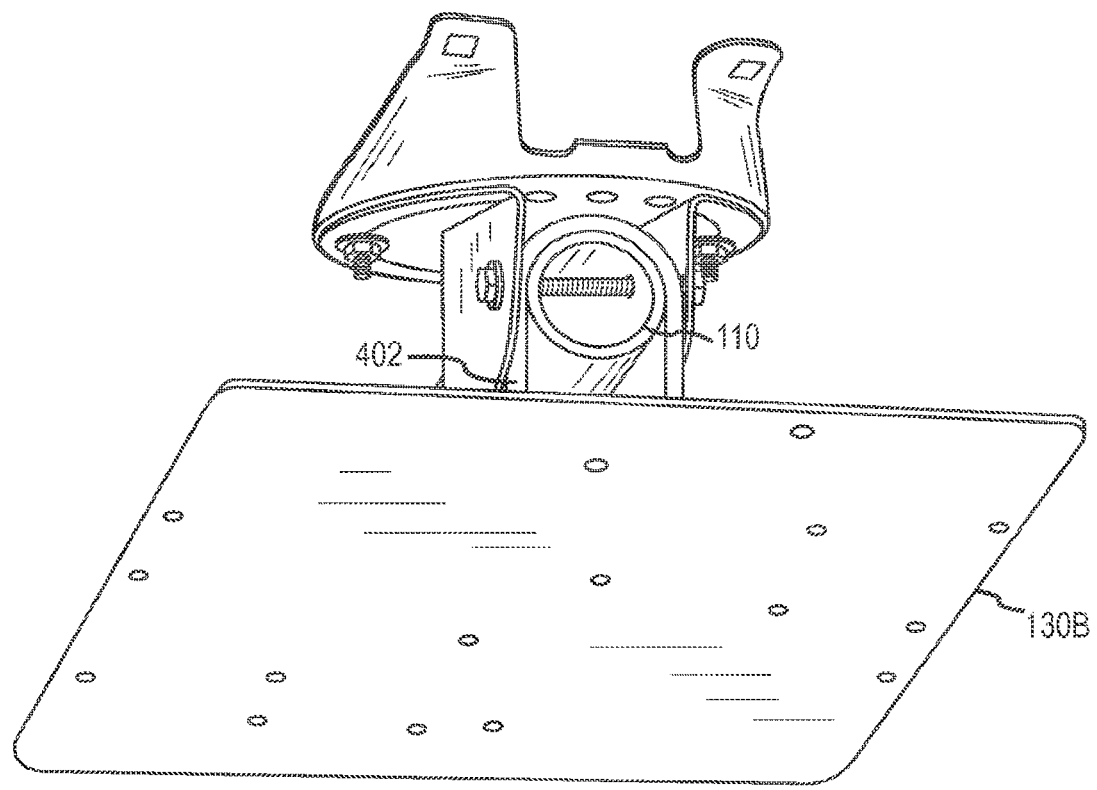

FIG. 4 illustrates another embodiment of the mounting plate 130 of FIG. 1. As illustrated in FIG. 4, the mounting plate 130B includes a tubing bracket 402 configured to attach to the mast 110 and/or mast clamp 112 as illustrated in FIG. 5. More particularly, in at least one embodiment, the tubing bracket 402 is configured to slip into or over the mast clamp 112. The tubing bracket 402 includes a first portion 404 having a first diameter sized to fit within a like sized cavity of the mast clamp 112 or over the diameter of the mast clamp 112. The tubing bracket 402 includes a second portion 406, attached to the second side 412 of the planar surface 404. The second portion 406 may have the same diameter as the first portion 404 or may alternatively have a larger or smaller diameter than the first portion 402, depending on desired design criteria. The first portion 404 may optionally include one or more through holes 408A-408B configured to receive securing mechanisms that provide for attachment to the mast clamp 112.

Figure 6:
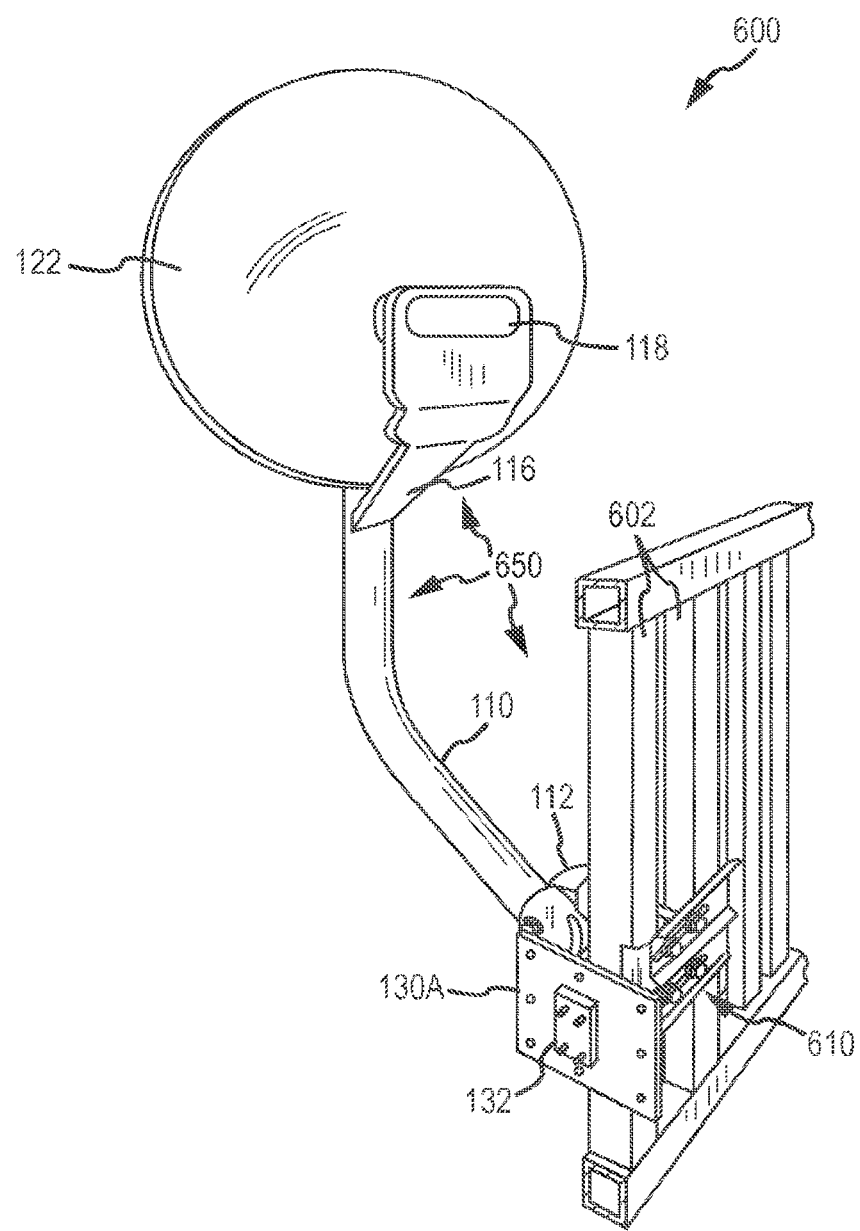
FIG. 6 illustrates an embodiment of a railing mount system including the mounting plate of FIG. 2.

In some embodiments, a mounting plate may be attached to other objects, such as a railing mount. FIG. 6 illustrates an embodiment of a railing mount system 600 including the mounting plate 130A of FIG. 2. More particularly, FIG. 6 illustrates the mounting plate 130A mounted perpendicular to the other plates of the mounting assembly.

Figure 7:
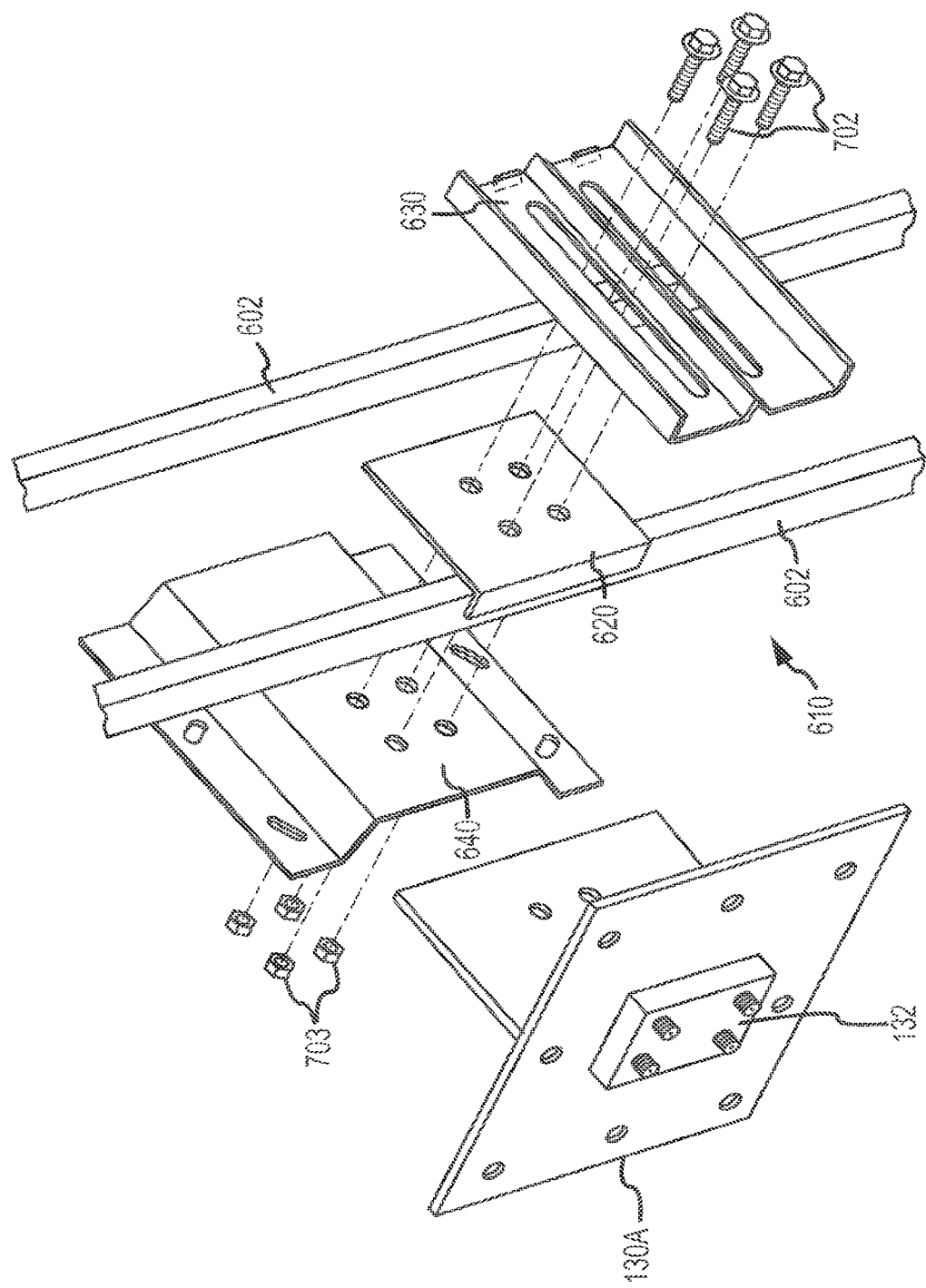
FIG. 7 depicts an exploded view of an embodiment of the various plates of an antenna mount of FIG. 7.

FIG. 7 depicts an exploded view of an embodiment of the various plates of an antenna mount 610 of FIG. 7. In the embodiment of FIG. 7, the mounting plate 130A includes a T-bracket that enables mounting perpendicular to the plates 620, 630 and 640. In the exemplary embodiment of FIGS. 6 and 7, the system may include an antenna mount 610 comprising multiple plates that clamp to a railing 602. Furthermore, the mounting plate 130A is clamped between the various plates of the mounting system, providing a location for mounting of the switch device 132. The details, features, and elements of these components of the antenna mount 600 are discussed in more detail below. The antenna mount 600 is coupled to an antenna assembly 650, which includes components similar to the mounting environment of FIG. 1. Discussion of components common to FIG. 1 is omitted herein for the sake of brevity. The antenna mount 600 may be coupled to a foot section 112 of the antenna assembly, as described below.

Antenna mount 600 includes a first plate 620, a second plate 630, third plate 640 and mounting plate 130A. First plate 620 may be secured to second plate 630 with one or more attachment devices 702, thereby forming a plate assembly. In at least one embodiment, attachment devices comprise bolts. The attachment devices may extend through the second plate 630 and the first plate 620 to attach the plate assembly to the third plate 640 and the mounting plate 130A in order to clamp the railing 602 between the plate assembly and the third plate 640. The mounting plate 130A may secure an electrical switching device 132 (not shown in FIG. 7) as described in detail above. In at least one embodiment attachment devices 702 may further comprise one or more nuts 703.

Figure 8:
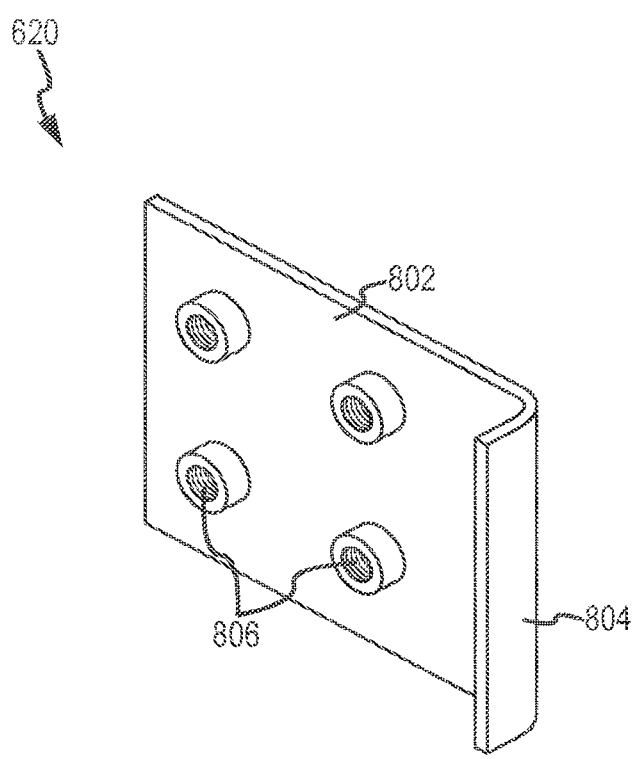
FIG. 8 depicts one component of an antenna mount according to one embodiment.

FIG. 8 depicts one component of an antenna mount according to one embodiment: a first plate 620 including a substantially planar section (i.e., a planar surface) 802 and a flange 804. In the specific embodiment of FIG. 8, the flange 804 is formed at an end of the planar section 802, although various locations for the flange 804 may be possible in other examples. The first plate 620 also defines a plurality of openings, e.g., holes 806, through which may extend bolts, screws, or other fasteners. In one implementation, the holes 806 are threaded to accept an appropriately sized bolt for securely attaching the first plate 620 to other structures, as is described in greater detail below. In another implementation, a threaded structure, such as a nut, may be integrated with the planar section 802 and aligned with each of the holes 806. Further, while four holes 806 are shown in FIG. 8, any number of holes may be utilized in other embodiments.

In one embodiment, the first plate 620, as well as the remaining plates described hereinafter (such as the mounting plate 130A), may be fabricated from sheet metal or another material of sufficient strength to resist flexing and deformation, especially under inclement weather conditions, such as strong winds, heavy rains, and the like. Other materials, such as plastic, fiberglass, or composite materials, may be employed in other implementations. Also, the first plate 620, as well as others described below, may be approximately one-eighth to one-sixteen inch thickness, although any other thickness may be utilized so that the plate 620 is fashioned to withstand the gravitational and external forces expected in the environment in which the antenna will be mounted.

Figure 9:
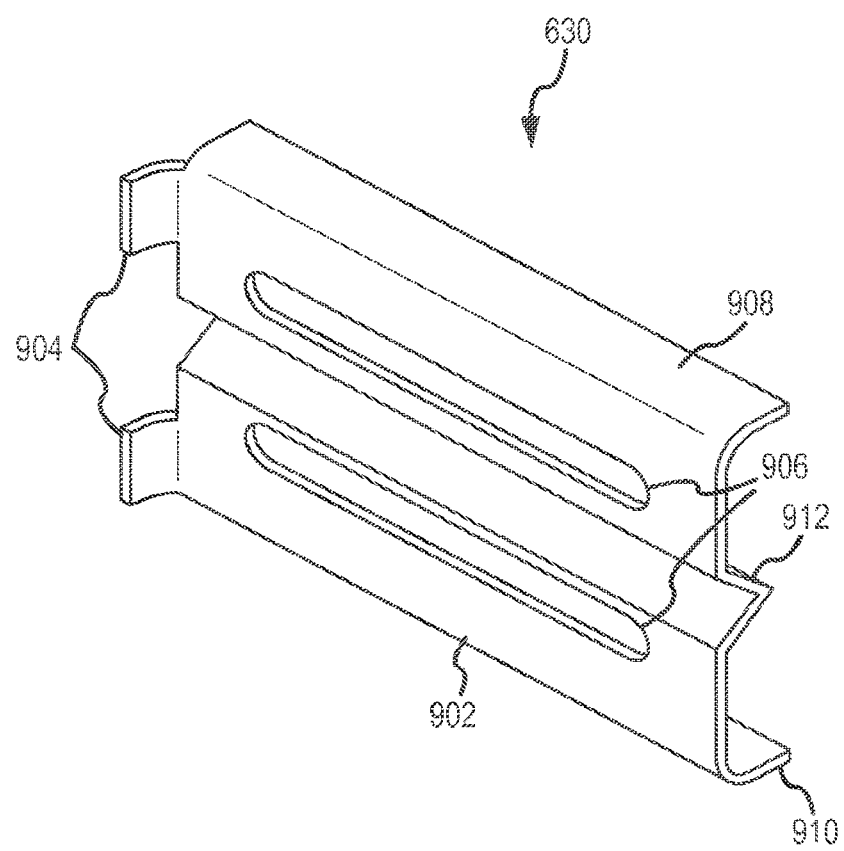
FIG. 9 illustrates an embodiment of a second plate depicted in FIG. 6.

FIG. 9 illustrates an embodiment of a second plate 630 depicted in FIG. 6. The plate 630 includes a planar section 902 and member 904. Surface 902 defines a pair of elongated openings (i.e., slots) 906 for adjustment purposes. Second plate 630 further includes members 904 extending from one end of surface 902, which are disposed at a transverse angle to surface 902.

In the embodiment of a second plate of FIG. 9, an upper extension 908 and a lower extension 910 may extend from opposing edges of surface 902 in an opposing direction from members 904. These extensions 908, 910 may serve to maintain the structural integrity of the surface 902. The extensions 908, 910 may also be utilized as a registration surface for proper alignment of the second plate 630 with another surface. In other examples, the extensions 908, 910 may be eliminated from the second plate 630.

Second plate 630 may additionally include a stiffener, depicted in this example as a corrugation 912 that is disposed longitudinally in the surface 902. In some embodiments, corrugation 912 may be defined by the surface 902. In the example of FIG. 9, the corrugation comprises an angular extrusion from the plane of the surface 902, which extrudes from the surface 902 in an opposing direction from members 904. The corrugation 912 may function as a stiffener to further maintain the structural integrity of the second plate 630, given that torque and/or other forces from an attached antenna may be exerted on the plate 630 and other components attached thereto.

Figure 10:
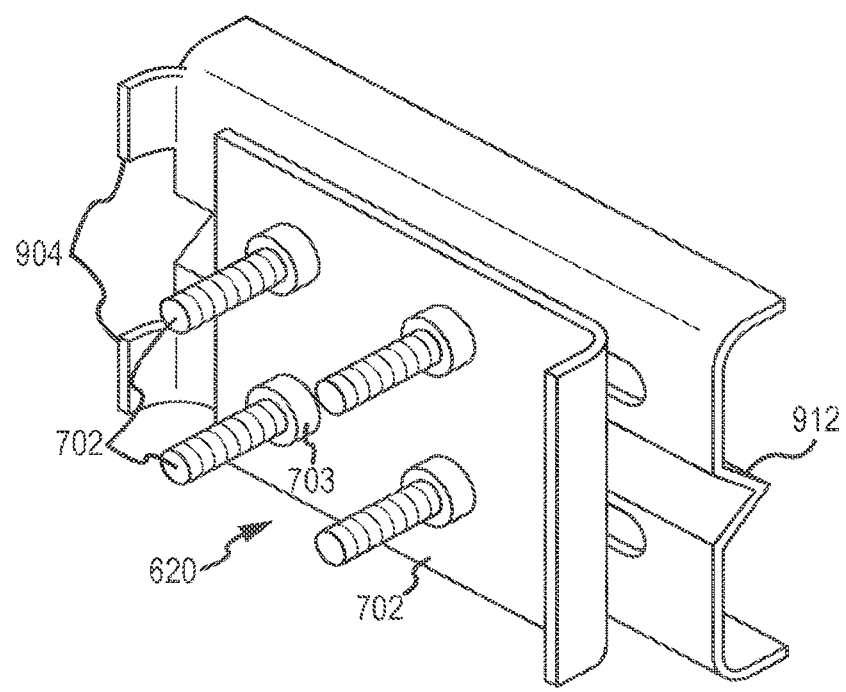
FIGS. 10 and 11 provide a perspective view of the first plate and the second plate in one embodiment.

FIG. 10 provides a perspective view of the first plate 620 and the second plate 630 aligned so that bolts 702 or other attachment devices may be inserted through the slots 706 of the second plate 630 and threaded through the threaded structures 808 of the first plate 620. In another embodiment, the holes 806 of the first plate 620 may themselves be threaded for engagement with the bolts 702. In another example, threaded nuts separate from the first plate 620, including locking nuts, serrated hex head nuts, nuts integrated with lock washers, and the like, may be threaded onto the bolts 702 in order to affix the first plate 620 to the second plate 630. The bolts 702 may first be threaded through another component, such as a washer or lock washer (not shown in FIG. 10), before being inserted through its corresponding slot 906 of the second plate 630 and associated hole 806 of the first plate 620. Such a component may provide a stable surface against which the head of the bolt 702 may exert a tightening force onto the second plate 630.

In FIG. 10, the first plate 620 and the second plate 630 are connected via the bolts 702, but are yet to be rigidly attached together. This arrangement allows the first plate 620 to translate back and forth along the direction of the slots 906 of the second plate 630, thus allowing the distance between the flange 804 of the first plate 620 and the members 904 of the second plate 630, in an embodiment with second plate 630—to be adjusted.

Figure 11:
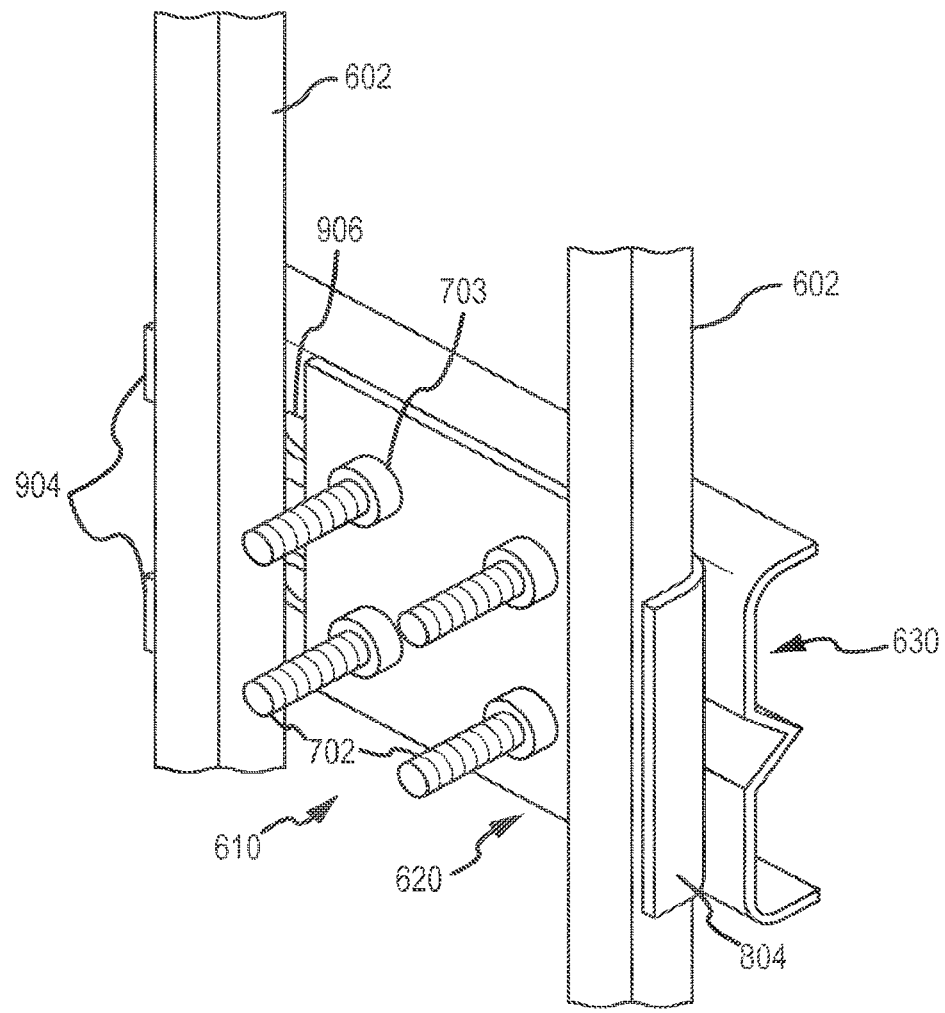

FIG. 11 provides a perspective view of the first plate 620 and the second plate 630, in which the distance between the flange 804 of the first plate 620 and the members 904 of the second plate 630 has been adjusted to contact or abut, and possibly grip, oppositely-facing surfaces of two adjacent support posts of a railing 602 or banister.

In other examples, the support posts 602 may be manufactured from wood, plastic, fiberglass, or another material. Such a railing may be found at an apartment, condominium, or other multi-dwelling unit. Other environments may provide structures similar to the support posts 602.

Once this adjustment has been made, such that flange 804 of first plate 620 and members 904 of second plate 630 abut the support posts 602, the bolts 702 may be tightened while the first plate 620 and the second plate 630 are held stationary against the posts 802 to rigidly attach and secure the first plate 620 to the second plate 630, i.e., to form a plate structure or plate assembly 610 as depicted in FIG. 11. In one example, the flange 804 and members 904 may exert enough force on the adjacent support posts 602 to at least temporarily maintain the position of the plate assembly 610 against the posts 602.

The first plate 620 and the second plate 630 may be sized and configured to be adapted to a number of different mounting bases. More specifically, features of the first plate 620 and the second plate 630 that may be modified to accommodate different environments including the number and relative spacing of the holes 806 and slots 906, and the length of the plates 620 and/or 630. For example, if longer spans between adjacent support posts 602 are anticipated, one or both of the first plate 620 and the second plate 630 may each be fashioned to be long enough so that the resulting plate assembly 610 spans at least two adjacent posts 602. Also, the length of the slots 906 may be altered so that the overall length of the plate assembly 610 may be adjusted to fit a predetermined range of distances between posts 802.

In other arrangements, other objects or surfaces may serve as the mounting base to which the first plate 620 and the second plate 630 attach. For example, railing support posts of varying size and width may be utilized as the mounting base. Other vertically- or horizontally-oriented structures located sufficiently close to each other may present another possibility. In other examples, any stable surface or object capable of being placed in contact with the flanges 804 and members 904, in the embodiment depicted in FIG. 11—so that the plate assembly 610 may span the object while allowing the first plate 620 and the second plate 630 to be firmly attached to each other may also be used.

Figure 12:
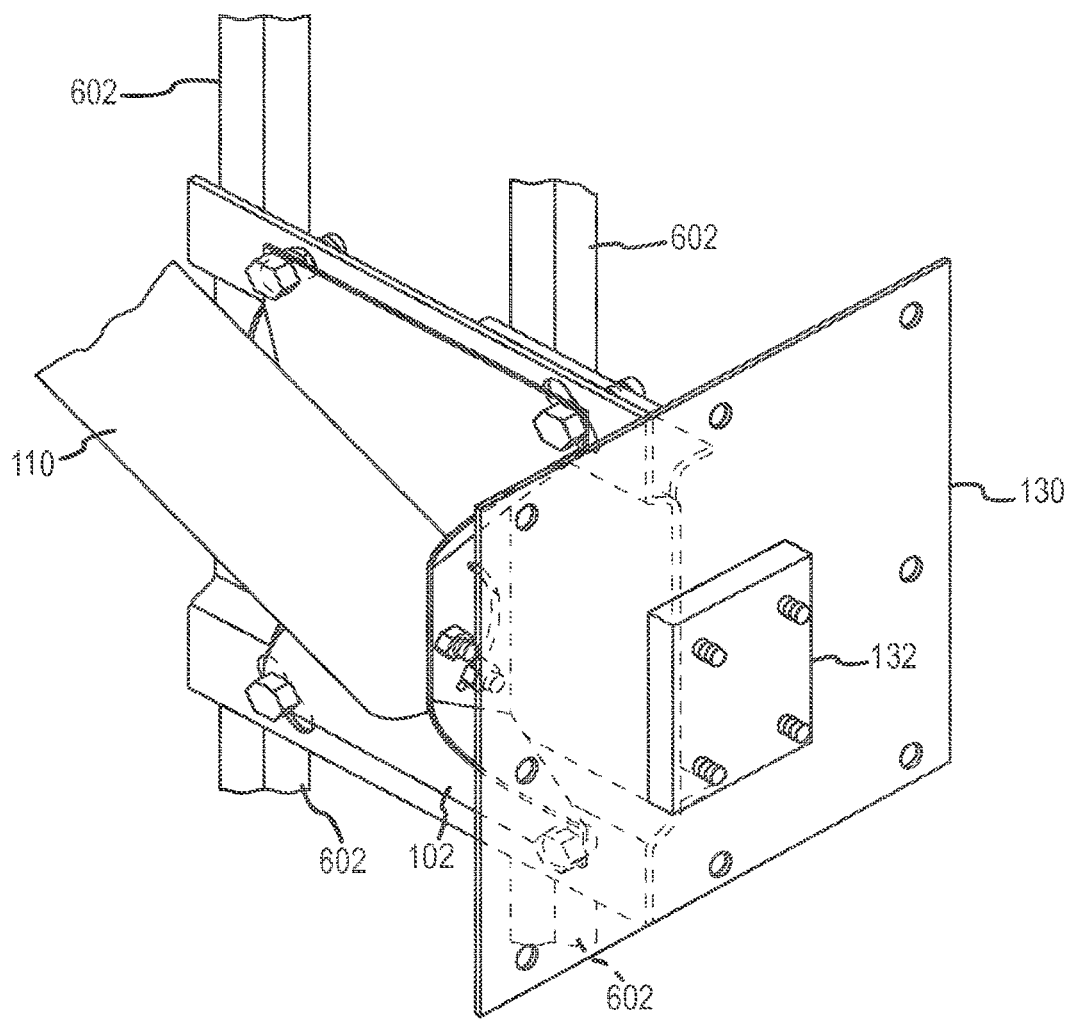
FIG. 12 provides a view of the third plate of FIG. 6 securely affixed to the plate assembly of FIG. 11.

FIG. 12 provides a view of the third plate 640 of FIG. 6 securely affixed to the plate assembly 610 of FIG. 11 (obscured from view in FIG. 12) by nuts 1202 threaded onto the bolts 702 extending from the plate assembly 610, and subsequently tightened. Furthermore, mounting plate 130A is shown as attached between the third plate 640 and the plate assembly 610 via the same bolts 702. This orientation provides a clamp force applied to the mounting plate 130A by both the third plate 640 and the railing 602. Thus, the mounting plate 130A is held in place and provides a convenient location for mounting of an electrical switching device 132 (see FIG. 1A and FIG. 1B).

Figure 13:
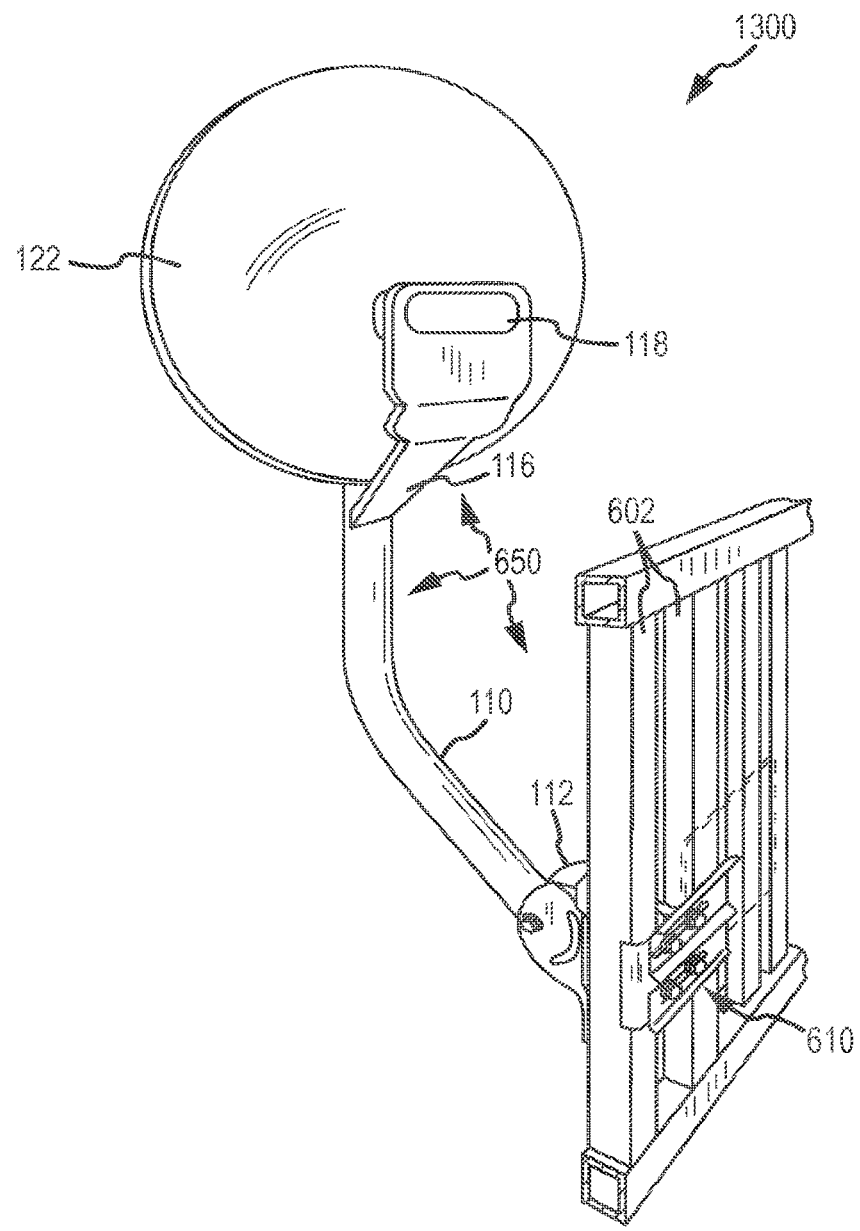
FIGS. 13, 14, 15, 16, and 17 illustrate multiple views of embodiments of a mounting plate attached to the side of a mounting assembly.
Figure 14:
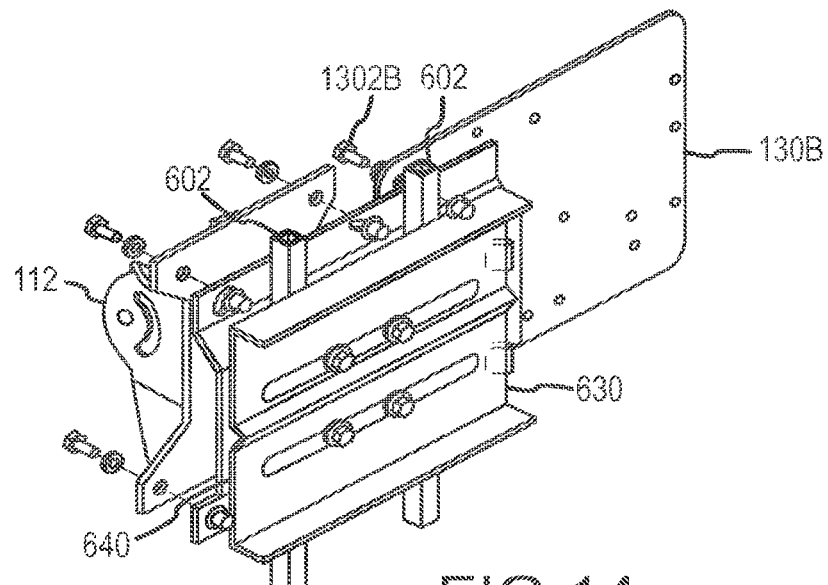
Figure 15:
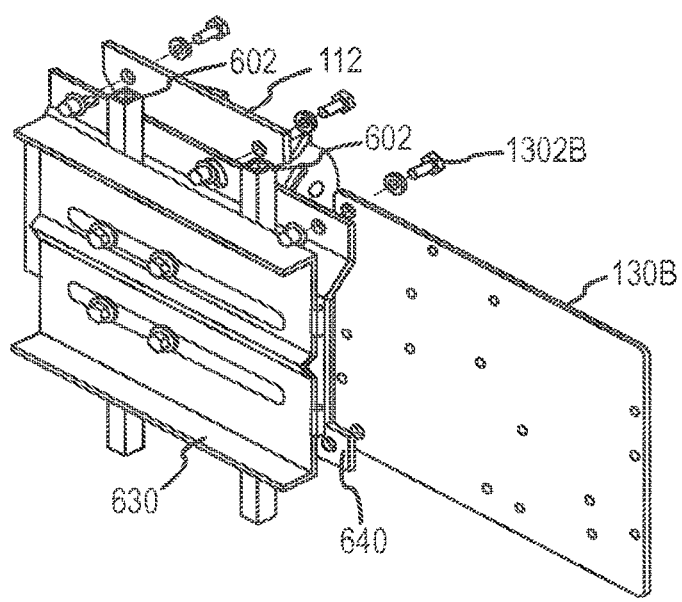
Figure 16:
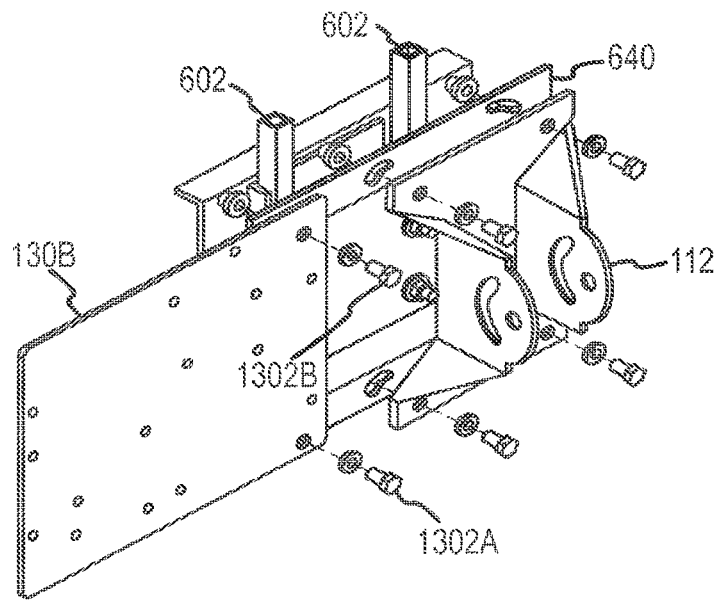
Figure 17:
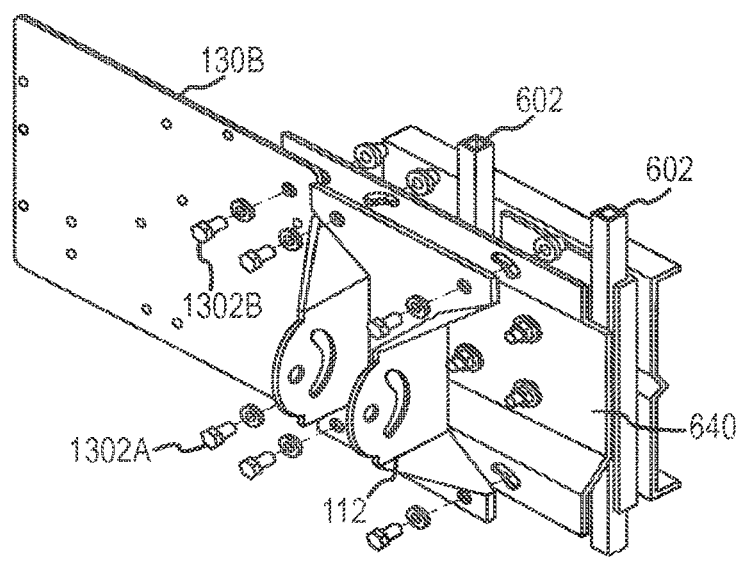
Figure 18:
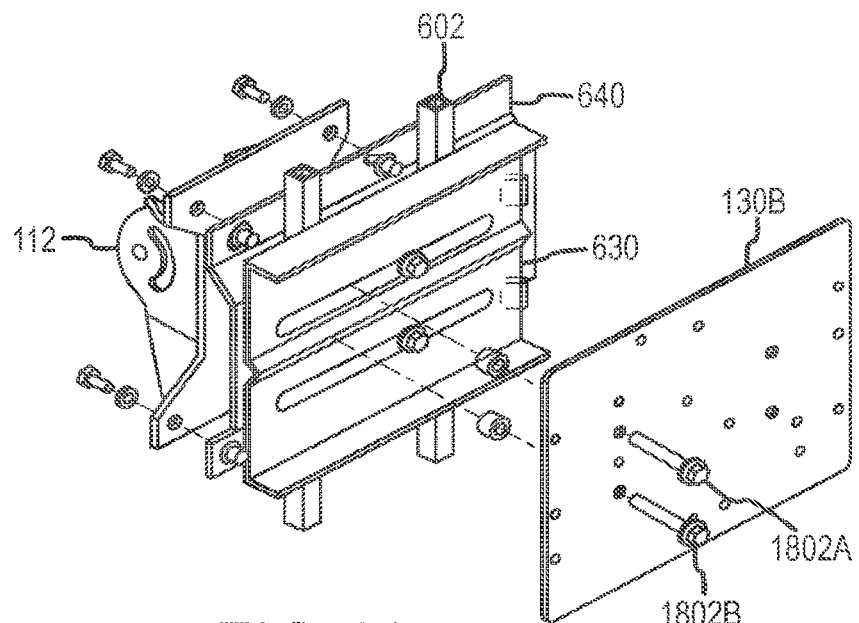
FIGS. 18, 19, 20, and 21 illustrate multiple views of embodiments of a mounting plate attached to the front of a mounting assembly.
Figure 19:
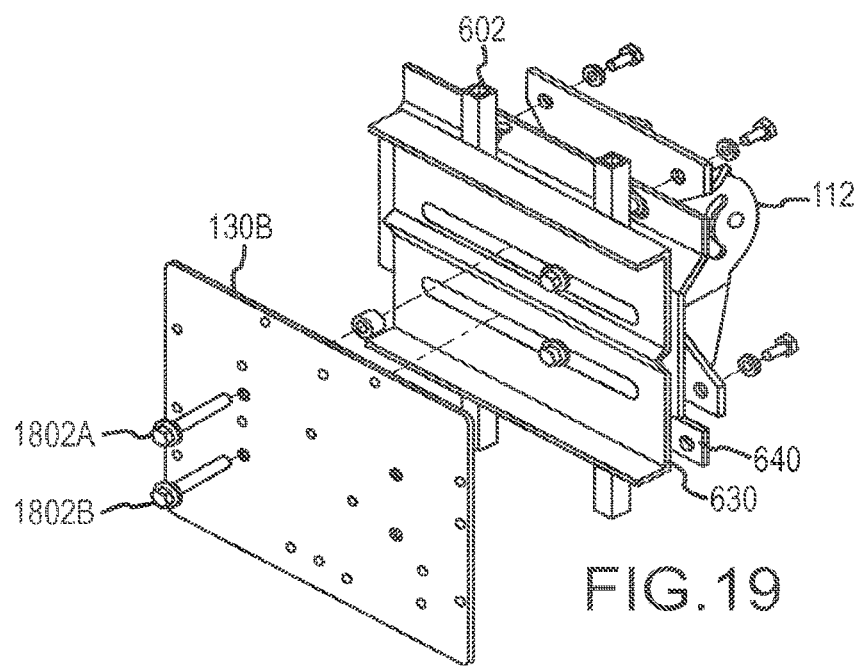
Figure 20:
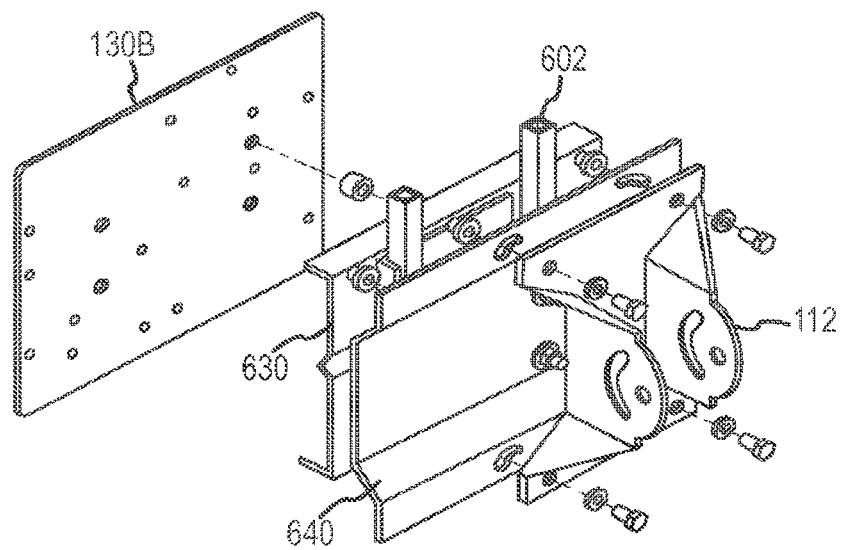
Figure 21:
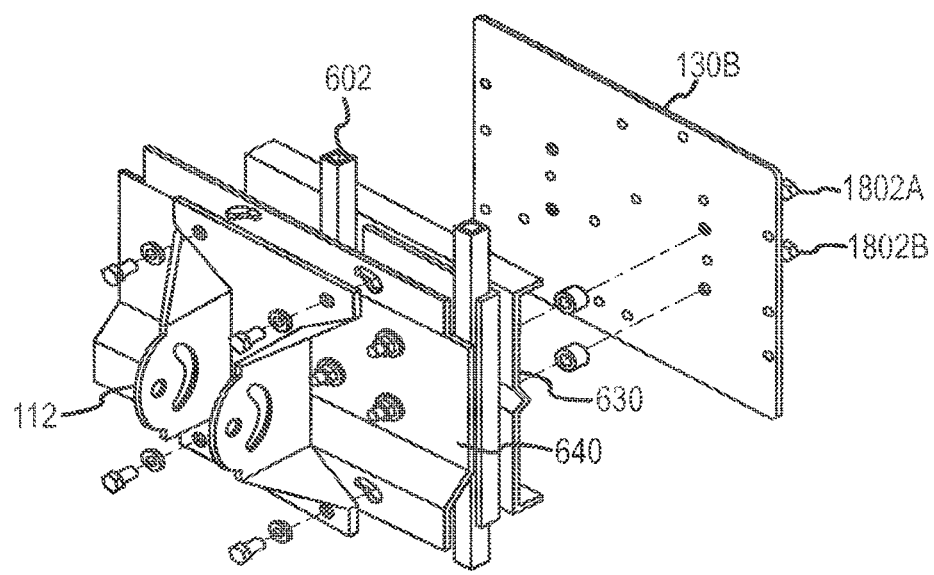

FIG. 13 illustrates another embodiment of a railing mount system 1300 including a mounting plate 130B. More particularly, FIG. 13 illustrates a mounting plate 130B mounted parallel to the other plates of the mounting assembly. The mounting system 1300 of FIG. 13 is similar to the mounting system 600 of FIG. 6. However, the mounting plate 130B may attach to the mounting assembly via appropriate securing mechanisms that enable mounting on the opposite side of the mounting assembly 610. As shown in FIGS. 13-17, the mounting plate 130B comprises a planar surface and a similar hole pattern as the mounting plate 130A for mounting of the electrical switching device 132 (not shown in FIGS. 13-18). Through holes are provided along one or more edges of the mounting plate 130B to receive securing mechanisms which secure the mounting plate 130B to the mounting assembly 610. Thus, the mounting plate 130B may be mounted parallel with the other plates 620, 630 and 640 against the pickets of the railing 602.

As shown in FIGS. 14, 15, 16 and 17, the mounting plate 130B may attach to either edge of the plate 640 via securing mechanisms 1302A-1302B. More particularly, the mounting plate 130B may attach to either side of plate 640, depending on desired design criteria. In at least one embodiment, the securing mechanisms comprise nuts and bolts. Alternatively, the mounting plate 130B may attach directly to the face of the plate 630 as shown in the mounting assembly 1800 in FIGS. 18-21, via securing mechanisms 1802A-1802B. The hole patterns within the mounting plate 130B may provide for various mounting orientations and configurations, to provide flexibility for an installer to choose an appropriate mounting technique for the mounting plate 130B, depending on desired design criteria.

Figure 22:
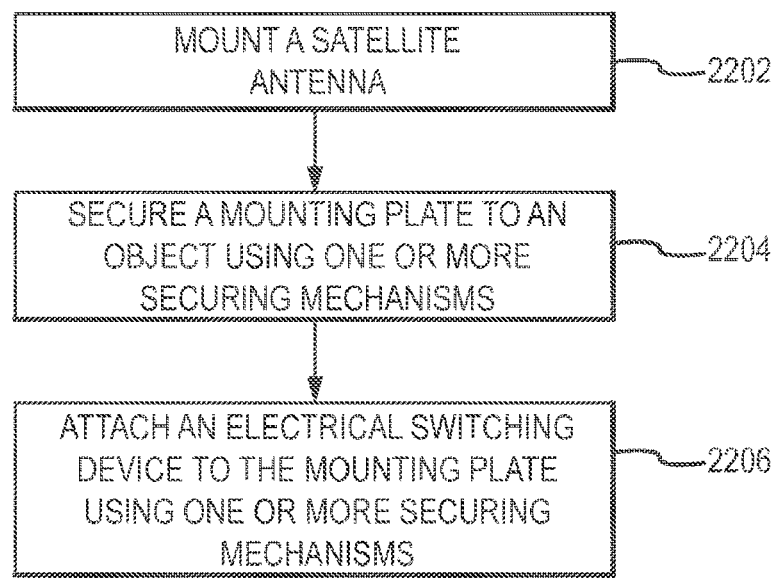
FIG. 22 illustrates an embodiment of a process for mounting an electrical switching device to a satellite antenna.

FIG. 22 illustrates an embodiment of a process for mounting an electrical switching device to a satellite antenna. The process of FIG. 22 may include other operations not illustrated for the sake of brevity.

The process includes mounting a satellite antenna (operation 2202). For example, a satellite antenna may be mounted to the side of a structure or to a railing of the structure using a railing mount. The process further includes securing a mounting plate to an object (such as the mast clamp 112, the railing mount 610 or the mast 110 of FIGS. 1A and 6) using one or more securing mechanisms (operation 2204). The process further includes attaching an electrical switching device to the mounting plate using one or more securing mechanisms (operation 2206).

Although specific embodiments were described herein, the scope of the invention is not limited to those specific embodiments. The scope of the invention is defined by the following claims and any equivalents therein.

What is claimed is:
1. A system comprising:
a railing mount attached to at least one railing of a structure;
a base attached to the railing mount;
a mast attached to the base;
a mast clamp attached to the mast, the mast clamp configured to secure an antenna to the mast;
an electrical switching device communicatively coupled to the antenna; and
a mounting plate comprising:
a planar surface, the planar surface including a plurality of first through holes, each of the first through holes configured to secure the electrical switching device to a first side of the planar surface; and
a plurality of second through holes configured to receive a plurality of securing mechanisms that secure the mounting plate to the railing mount.

2. The system of claim 1, wherein the first through holes are configured to secure different sized electrical switching devices to a first side of the planar surface.

3. The system of claim 1, wherein the first through holes are configured to secure electrical switching device to a first side of the planar surface in different orientations.

4. The system of claim 1, wherein the railing mount comprises:
a first plate;
a second plate; and
a third plate.

5. The system of claim 4, wherein:
the first plate is disposed on a first side of the at least one railing; and
the second plate and the third plate are disposed on a second side of the at least one railing, opposite the first side.

6. The system of claim 5, wherein:
the second plate comprises a first flange;
the third plate comprises a second flange; and
the first flange and the second flange compress adjacent support posts of the at least one railing towards each other when coupled with the at least one railing.

7. The system of claim 5, wherein the railing mount further comprises:
a plurality of securing mechanisms in tension when coupled with the first plate, the second plate, and the third plate.

8. The system of claim 5, wherein:
the base is coupled with the first plate via four apertures in the first plate.

9. The system of claim 5, wherein:
the first plate defines at least four round apertures;
the second plate defines at least four round apertures; and
the third plate defines at least two slotted apertures.

10. The system of claim 9, wherein the railing mount further comprises:
a plurality of securing mechanisms coupling the first plate, the second plate, and the third plate, wherein:
at least two securing mechanisms pass through each of the slotted apertures in the third plate;
at least one securing mechanism passes through each of the round apertures in the second plate; and
at least one securing mechanism passes through each of the round apertures in the first plate.

11. The system of claim 9, wherein the at least four round apertures of the second plate are threaded.

12. The system of claim 5, wherein the first plate comprises:
a recessed portion for coupling to the second plate and the third plate, and a raised portion for coupling to the base.

13. The system of claim 12, wherein:
the raised portion is further for coupling to the mounting plate.

14. The system of claim 5, wherein:
the second plate is disposed between the first plate and the third plate.

15. The system of claim 14, wherein:
the second plate is disposed between the third plate and the at least one railing.

16. The system of claim 5, wherein:
the third plate is in direct contact with the second plate;
the second plate is in direct contact with the at least one railing; and
the at least one railing is in direct contact with the first plate.

17. The system of claim 5, wherein the third plate comprises:
a corrugation extending from a first edge of the third plate to a second edge of the third plate, the second edge opposite the first edge.

18. The system of claim 17, wherein:
the corrugation is characterized by a V-shaped cross-section.

19. The system of claim 5, wherein the third plate comprises:
a plurality of flanges at opposing edges of the third plate extending away from the at least one railing.

* * * * *